United States Patent
Park et al.

(10) Patent No.: US 8,654,461 B2
(45) Date of Patent: Feb. 18, 2014

(54) LENS POSITIONING UNIT OF OPTICAL SYSTEM

(75) Inventors: Sang Hyun Park, Yongin-si (KR); In Bae Jang, Seoul (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 0 days.

(21) Appl. No.: 13/298,502

(22) Filed: Nov. 17, 2011

(65) Prior Publication Data

US 2012/0154936 A1  Jun. 21, 2012

(30) Foreign Application Priority Data

Dec. 17, 2010  (KR) .................. 10-2010-0130220

(51) Int. Cl.
*G02B 7/02*  (2006.01)

(52) U.S. Cl.
USPC ........... 359/822; 359/823; 359/813; 359/694; 396/144; 396/132; 396/448

(58) Field of Classification Search
USPC ......... 359/813, 814, 822–824, 694, 696, 699; 396/55, 72–79, 132, 144, 349, 448; 348/240.3

See application file for complete search history.

(56) References Cited

U.S. PATENT DOCUMENTS

| | | | | |
|---|---|---|---|---|
| 4,634,221 A | * | 1/1987 | Hopfner | 359/824 |
| 5,196,963 A | * | 3/1993 | Sato et al. | 359/699 |
| 5,249,082 A | * | 9/1993 | Newman | 359/813 |
| 5,313,244 A | * | 5/1994 | Arai | 396/132 |
| 5,416,549 A | * | 5/1995 | Katsuyama et al. | 396/529 |
| 7,292,396 B2 | * | 11/2007 | Ito et al. | 359/703 |
| 7,304,806 B2 | * | 12/2007 | Huang | 359/694 |
| 7,330,648 B2 | * | 2/2008 | Morinaga et al. | 396/144 |
| 7,609,467 B2 | * | 10/2009 | Blanding et al. | 359/823 |
| 8,289,626 B2 | * | 10/2012 | Nomura | 359/696 |
| 8,351,138 B2 | * | 1/2013 | Kuo et al. | 359/811 |
| 2007/0050024 A1 | | 3/2007 | Zhang | |

FOREIGN PATENT DOCUMENTS

JP  2009505796 A  2/2009

* cited by examiner

*Primary Examiner* — Loha Ben

(74) *Attorney, Agent, or Firm* — Harness, Dickey & Pierce, P.L.C.

(57) ABSTRACT

According to example embodiments, a lens positioning unit includes a fixed structure, a monolithic flexure hinge structure, any one of upper and lower portions of which is provided with a lens mount on which a lens is mounted and the other portion of which is secured to the fixed structure, and an input unit rotatably coupled to the fixed structure, the input unit serving to convert rotational motion into vertical translational motion so as to transmit the vertical translational motion to the upper or lower portion of the monolithic flexure hinge structure provided with the lens mount.

16 Claims, 6 Drawing Sheets

LENS POSITIONING UNIT OF OPTICAL SYSTEM

CROSS-REFERENCE TO RELATED APPLICATION

This application claims priority under 35 U.S.C. §119 to the benefit of Korean Patent Application No. 2010-0130220, filed on Dec. 17, 2010 in the Korean Intellectual Property Office, the entire disclosure of which is incorporated herein by reference.

BACKGROUND

1. Field

Example embodiments relate to a lens positioning unit of an optical system usable with an exposure apparatus, which performs lens position adjustment with one degree of freedom of micron-level precision within a minimum space.

2. Description of the Related Art

In order to assemble a barrel type optical system usable with an exposure apparatus, a large-diameter lens may be mounted in a unit cell barrel and precise stacking of cells may be performed.

The optical system assembled in the above-described manner may require adjustment of an infinitesimal axial distance between lenses for correction of magnification and aberration. In this case, reducing and/or preventing parasitic motion in directions other than an axial direction may be desired.

A screw type device may be used to adjust the distance between lenses. The screw type device may have an inner surface to which a lens is secured and the screw type device may serve to adjust the height of the lens via rotation thereof. However, this method causes rotation of an optical axis of the lens and has difficulty realizing pure vertical motion due to backlash and irregularity of screws.

SUMMARY

Example embodiments relate to a lens positioning unit of a barrel type optical system, which precisely adjusts an axial position of a lens without causing and/or substantially causing parasitic motion in directions other than an axial direction.

In accordance with example embodiments, a lens positioning unit of an optical system includes a hollow cylindrical housing, a monolithic flexure hinge structure in the housing, a doughnut-shaped adjustor ring screwed to an inner surface of the housing, and a ring-shaped spring secured to a lower portion of the monolithic flexure hinge structure. The ring-shaped spring may be configured to transmit vertical translational motion of the adjustor ring to the monolithic flexure hinge structure. The monolithic flexure hinge structure may include an upper portion secured to the housing. The lower portion of the monolithic flexure hinge structure may include a lens mount on which a lens is mounted.

The monolithic flexure hinge structure may include a radial flange at an upper end thereof, and the flange may be secured to an upper end of the housing.

The monolithic flexure hinge structure may include a recessed portion along an outer circumference of a lower end thereof, and the ring-shaped spring may be fitted into the recessed portion.

The lens mount may include a boss to come into point contact with the lens.

An inner circumferential surface of the adjustor ring may include a groove. The ring-shaped spring may be in the groove.

An adjustor may be configured to rotate the adjustor ring. A circumferential position of the housing may define an opening through which the adjustor is inserted to come into contact with the adjustor ring.

In accordance with example embodiments, a lens positioning unit of an optical system includes a doughnut-shaped lower structure including a movable part rotatably coupled to a top of a fixed part, and a monolithic flexure hinge structure in the lower structure. The monolithic flexure hinge structure may include a lower portion secured to the fixed part, and an upper portion of the monolithic flexure hinge structure may include a lens mount on which a lens is mounted. The upper portion of the monolithic flexure hinge structure may be supported on a wedge formed on an upper surface of the movable part. The wedge may be configured to convert rotational motion of the movable part into vertical translational motion of the upper portion of the monolithic flexure hinge structure.

An upper end of the monolithic flexure hinge structure may include a radial flange and the flange may be on the wedge.

A lower surface of the flange may include a ball bearing receptacle in which a ball bearing is accommodated.

The wedge may include a gradient of 1:20.

The lens positioning unit may further include a pusher to rotate the movable part.

The lens positioning unit may further include a locker to secure the movable part to the fixed part.

The lens positioning unit may further include a lens jig to be mounted on the lens mount.

In accordance with example embodiments, a lens positioning unit of an optical system includes a fixed structure, a monolithic flexure hinge structure, and an input unit rotatably coupled to the fixed structure. The monolithic flexure hinge structure may include an upper portion and a lower portion. One of the upper portion and the lower portion includes a lens mount on which a lens is mounted. The other portion of the upper portion and the lower portion may be secured to the fixed structure. The input unit may be configured to convert rotational motion into vertical translational motion so as to transmit the vertical translational motion to one of the upper portion and the lower portion of the monolithic flexure hinge structure including the lens mount.

BRIEF DESCRIPTION OF THE DRAWINGS

The foregoing and/or other features and advantages of example embodiments will become apparent and more readily appreciated from the following description of non-limiting embodiments, as illustrated in the in which like reference characters refer to the same parts throughout the different views. The drawings are not necessarily to scale, emphasis instead being placed upon illustrating the principles of inventive concepts. In the drawings.

DETAILED DESCRIPTION

Figure 1:
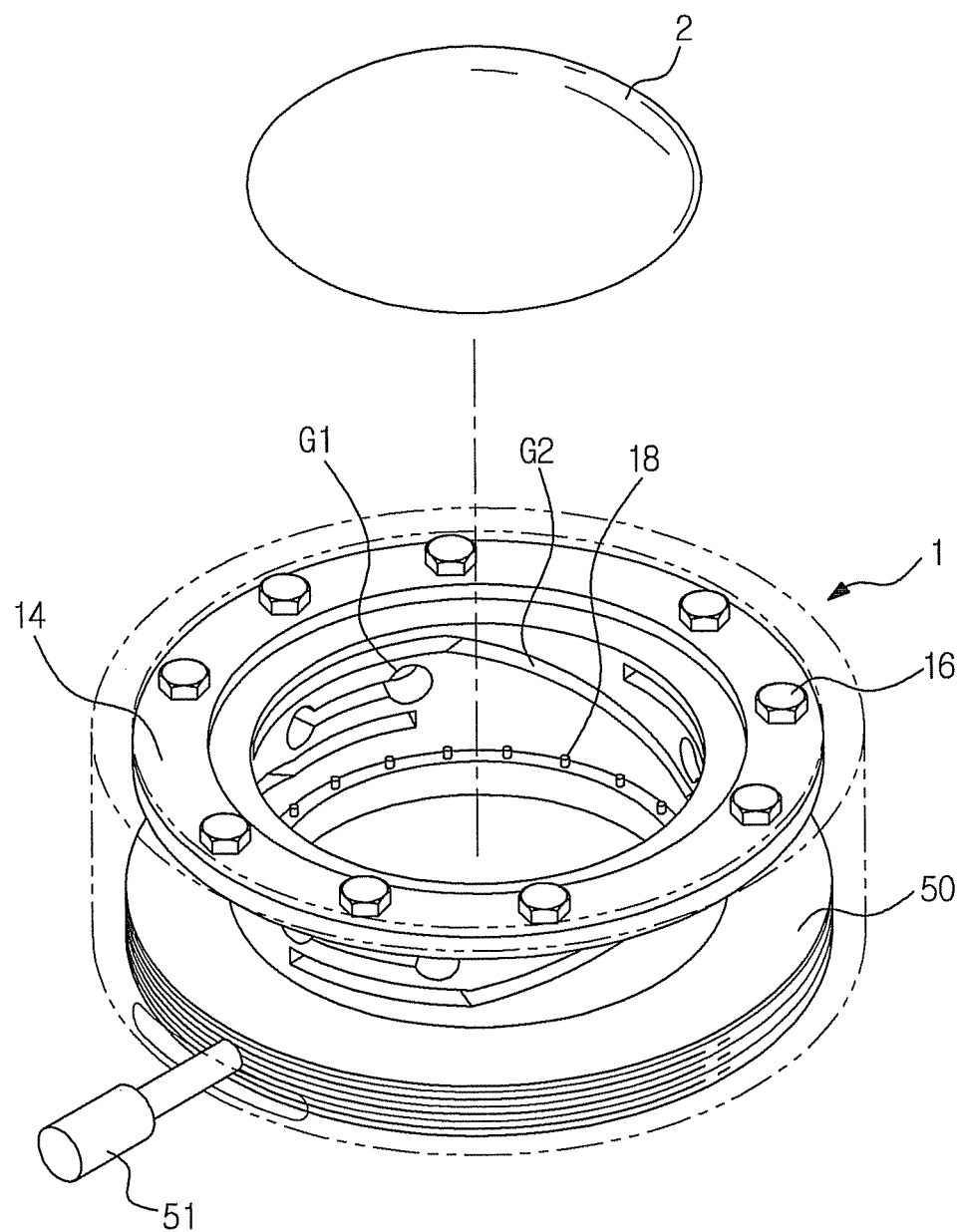
FIG. 1 is a perspective view illustrating a lens positioning unit of an optical system according to example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey concepts of example embodiments to those of ordinary skill in the art. In the drawings, the thicknesses of layers and regions are exaggerated for clarity. Like reference numerals in the drawings refer to like elements throughout, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
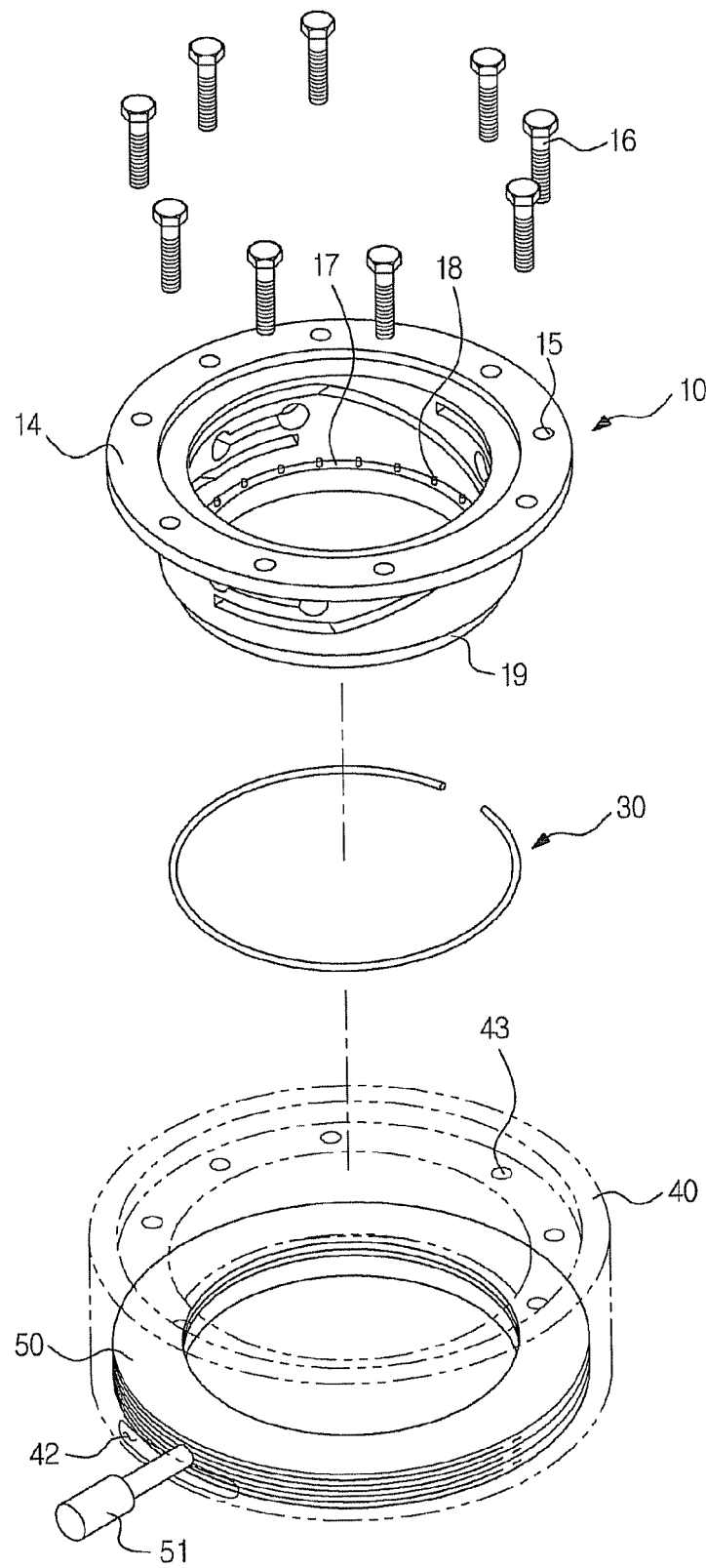
FIG. 2 is an exploded perspective view of the lens positioning unit of FIG. 1.
Figure 3:
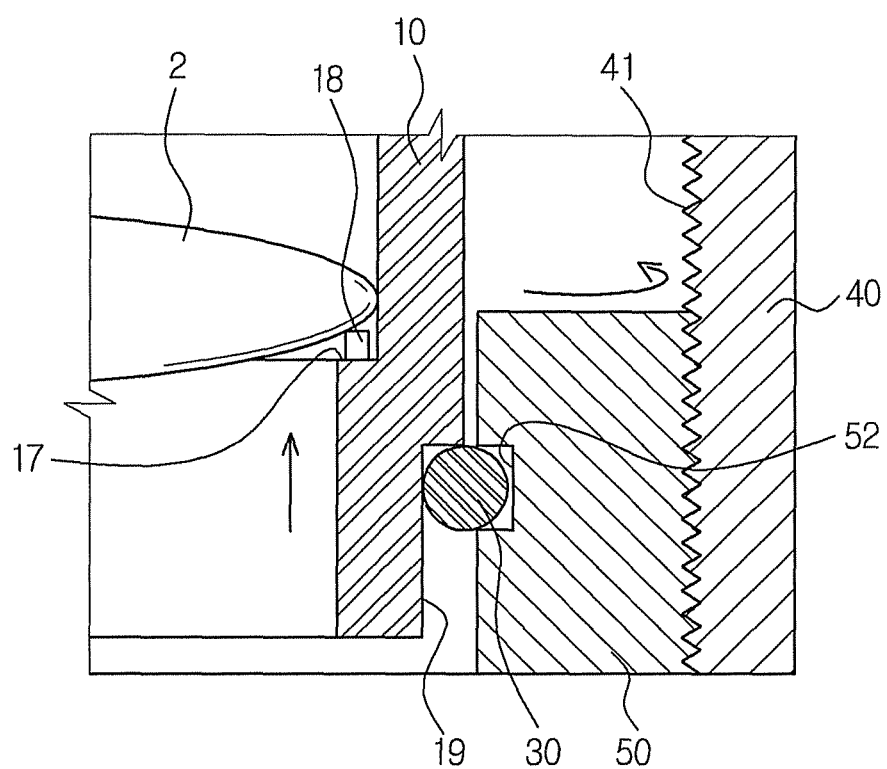
FIG. 3 is a sectional view illustrating a ring-shaped spring and its vicinities of the lens positioning unit of FIG. 1.

FIG. 1 is a perspective view illustrating a lens positioning unit of an optical system according to example embodiments. FIG. 2 is an exploded perspective view of the lens positioning unit of FIG. 1. FIG. 3 is a sectional view illustrating a ring-shaped spring and its vicinities provided in the lens positioning unit of FIG. 1.

Referring to FIGS. 1 to 3, a lens positioning unit 1 according to example embodiments includes a monolithic flexure hinge structure 10 provided with a lens mount 17 on which a lens 2 is mounted, a housing 40 in which the monolithic flexure hinge structure 10 is accommodated, and a doughnut-shaped adjustor ring 50 screwed to an inner surface of the housing 40.

The monolithic flexure hinge structure 10 may have a four-bar-link configuration and may be designed according to various standards as necessary. Owing to the slits (or holes) G1, G2 the monolithic flexure hinge may have elasticity.

The monolithic flexure hinge structure 10 may have an approximately hollow cylindrical shape. The lens mount 17 protrudes inward from a lower portion of the monolithic flexure hinge structure 10 to allow the lens 2 to be mounted thereon.

The lens mount 17 is circumferentially provided with a plurality of bosses 18 such that the lens 2 mounted on the lens mount 17 comes into point contact with the bosses 18. In this case, the lens 2 may be secured to the bosses 18 using epoxy.

A flange 14 is radially formed at an upper end of the monolithic flexure hinge structure 10. The flange 14 has fastening holes 15 through which fastening members 16 are inserted to secure the flange 14 to the housing 40. As the flange 14 is secured to the housing 40 using the fastening members 16, the upper end of the monolithic flexure hinge structure 10 is secured to the housing 40.

The monolithic flexure hinge structure 10 has a recessed portion 19 formed along an outer circumference of a lower end thereof. A ring-shaped spring 30 is fitted into the recessed portion 19.

The housing 40 has a hollow cylindrical shape to accommodate the monolithic flexure hinge structure 10 therein.

The housing 40 has fastening holes 43 for screw fastening with the flange 14 of the monolithic flexure hinge structure 10.

In addition, the housing 40 is provided at the inner surface thereof with screw threads 41 for screw fastening with the adjustor ring 50.

An opening 42 is perforated in a lower circumferential position of the housing 40. An adjustor 51, such as a bolt, etc., is inserted into the opening 42 to come into contact with the adjustor ring 50. The adjustor 51 serves to rotate the adjustor ring 50 relative to the housing 40.

The adjustor ring 50 has a doughnut shape and is screwed to the screw threads 41 formed on the inner surface of the housing 40 so as to move along the screw threads 41.

The adjustor ring 50 is provided at an inner circumferential surface thereof with a groove 52, into which the ring-shaped spring 30 is fitted. Thus, the ring-shaped spring 30, as illustrated in FIG. 3, is fitted in a space between the recessed portion 19 at the lower end of the monolithic flexure hinge structure 10 and the groove 52 in the inner circumferential surface of the adjustor ring 50. In this case, the ring-shaped spring 30 comes into close contact with the monolithic flexure hinge structure 10.

Thus, the ring-shaped spring 30 ensures free rotational motion of the adjustor ring 50, but restricts vertical motion of the adjustor ring 50. That is, the ring-shaped spring 30 and the monolithic flexure hinge structure 10 in close contact with the ring-shaped spring 30 are not affected by rotational motion of the adjustor ring 50, but are affected by vertical translational motion of the adjustor ring 50.

In this case, vertical translational motion of the monolithic flexure hinge structure 10 depending on vertical translational motion of the adjustor ring 50 is single-axis movement which restricts degrees of freedom in directions other than a vertical direction.

Figure 4:
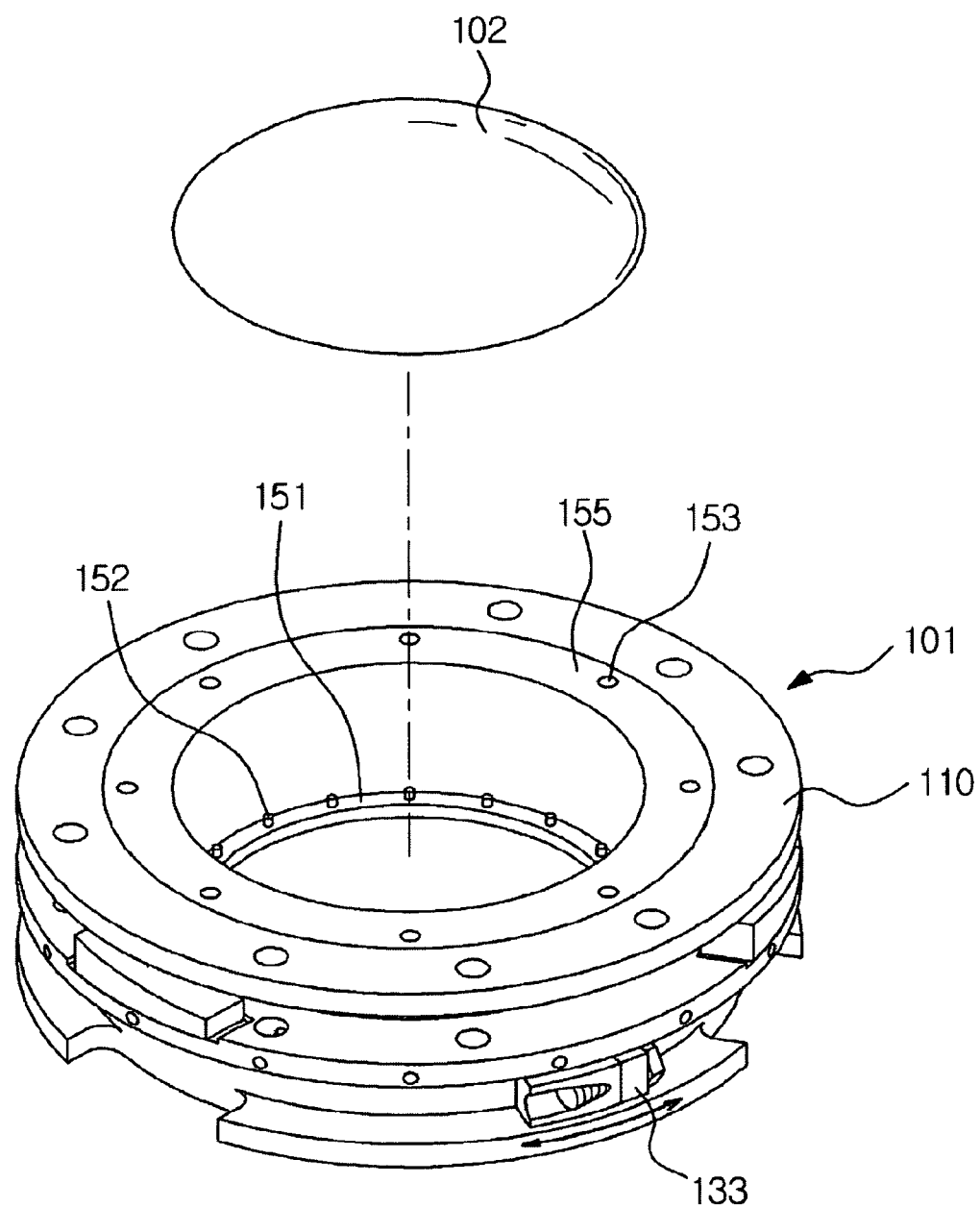
FIG. 4 is a perspective view illustrating a lens positioning unit of an optical system according to example embodiments.
Figure 5:
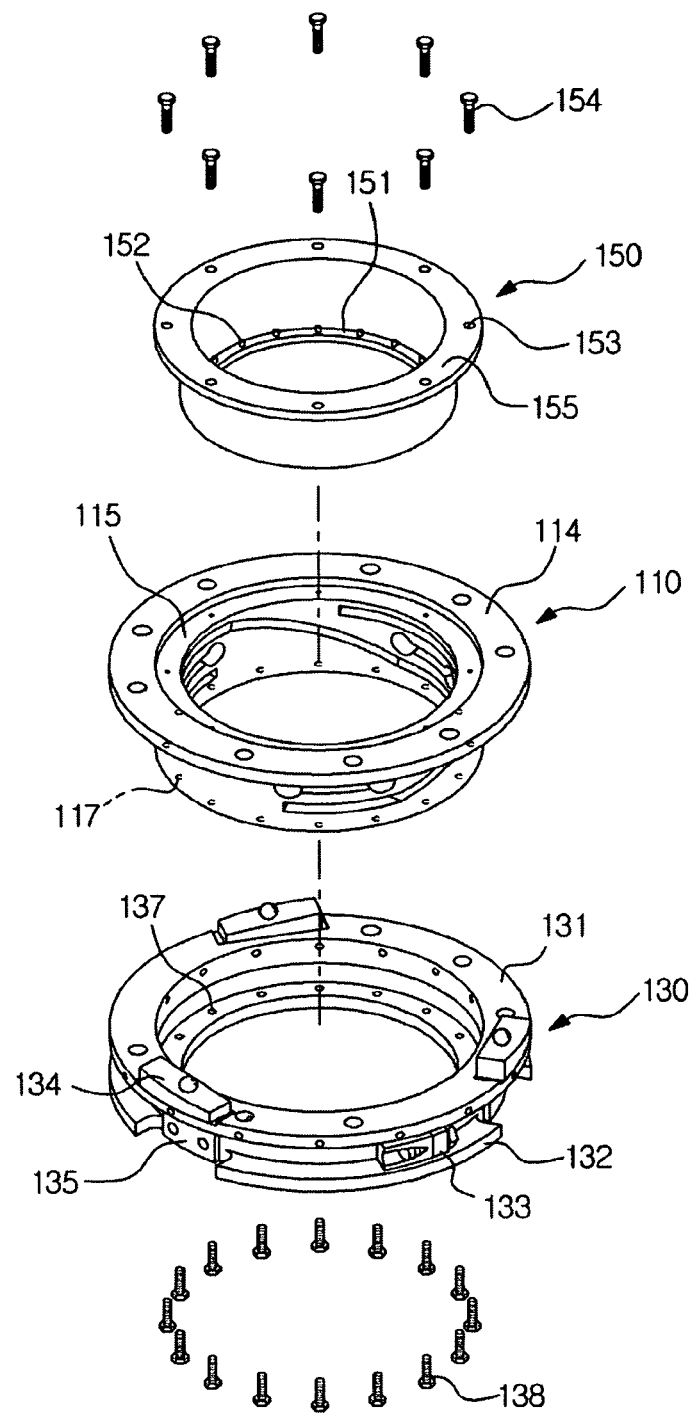
FIG. 5 is an exploded perspective view of the lens positioning unit of FIG. 4.

FIG. 4 is a perspective view illustrating a lens positioning unit of an optical system according to example embodiments. FIG. 5 is an exploded perspective view of the lens positioning unit of FIG. 4, and FIG. 6 is a sectional view illustrating a wedge and its vicinities of the lens positioning unit of FIG. 6.

Figure 6:
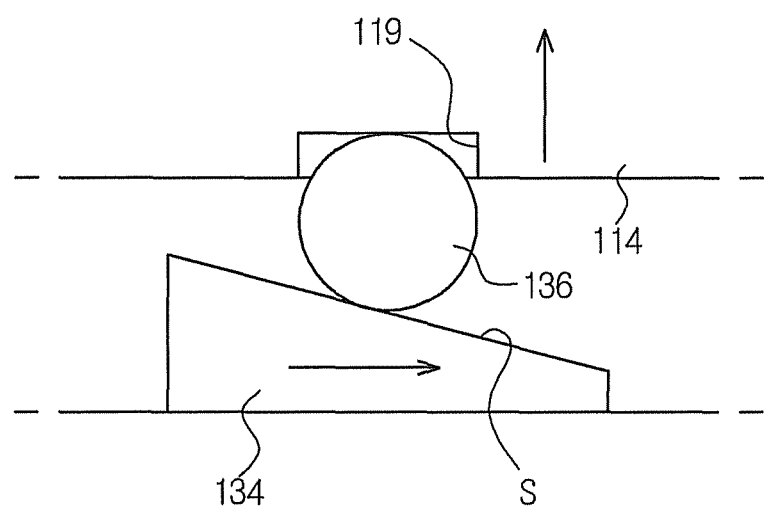
FIG. 6 is a sectional view illustrating a wedge and its vicinities of the lens positioning unit of FIG. 6.

Referring to FIGS. 4 to 6, a lens positioning unit 101 according to example embodiments includes a monolithic flexure hinge structure 110 provided with a lens mount 115 on which a lens 102 or a lens jig 150 is mounted, and a doughnut-shaped lower structure 130 in which the monolithic flexure hinge structure 110 is accommodated.

A lower portion of the lens jig 150 may include a jig lens mount 151 on which a lens 102 may be mounted. The jig lens mount 151 may be circumferentially provided with a plurality of boss members 152. The lens jig 150 may have an approximately hollow cylindrical shape. The jig lens mount 151 may protrude inward from a lower portion of the lens jig 150. An upper portion of the lens jig 150 may include a flange-portion 155 that is radially formed and includes a plurality of holes 153. Fastening pieces 154 may be inserted into the holes 153 to secure the lens jig 150 to the monolithic flexure hinge structure 110.

The lower structure 130 includes a fixed part 132 and a movable part 131 rotatably coupled to the top of the fixed part 132.

The fixed part 132 is provided at the bottom thereof with fastening holes 137 through which fastening members 138 are inserted to secure the monolithic flexure hinge structure 110 to the lower structure 130.

Three wedges 134 are formed on an upper surface of the movable part 131 to convert rotational motion into vertical translational motion. The wedges 134 may have a gradient of 1:20. To achieve gradient precision, a single piece is processed and then divided into three parts. The wedges 134 may provide mechanical precision.

The monolithic flexure hinge structure 110 is accommodated in the lower structure 130. The monolithic flexure hinge structure 110 is provided at the bottom thereof with fastening holes 117 through which the fastening members 138 are inserted to secure the monolithic flexure hinge structure 110 to the fixed part 132 of the lower structure 130. Thus, the bottom of the monolithic flexure hinge structure 110 is secured to the fixed part 132 of the lower structure 130.

The monolithic flexure hinge structure 110 is provided at an upper portion thereof with the lens mount 115. The lens 102 may be directly mounted on the lens mount 115. Alternatively, after the lens 102 is mounted on the lens jig 150, the lens jig 150 may be mounted on the lens mount 115.

A flange 114 is radially formed at an upper end of the monolithic flexure hinge structure 110. The flange 114 is supported by the wedges 134.

The flange 114 is provided at a lower surface thereof with a ball bearing receptacle 119 in which a ball bearing 136 is accommodated. The flange 114 is supported on an upper surface S of the wedges 134 with the ball bearing 136 interposed therebetween.

With the above described configuration, rotational motion of the movable part 131 outputs vertical motion of the flange 114 under assistance of the ball bearing 136. Specifically, the wedges 134 convert rotational motion of the movable part 131 into vertical translational motion of the upper end of the monolithic flexure hinge structure 110.

During vertical translational motion of the monolithic flexure hinge structure 110, the monolithic flexure hinge structure 110 restricts parasitic motion in five axes other than a vertical direction.

Additionally, the lower structure 130 may be provided with a pusher 133 to rotate the movable part 131. The pusher 133 may be configured to directly rotate the movable part 131 by pushing a screw pin into the movable part 131.

The lower structure 130 may be further provided with a locker 135 to keep the lens adjusted after completion of precise adjustment.

As described above, an aspect of example embodiments is that a lens is mounted at any one of upper and lower portions of a monolithic flexure hinge structure, the other portion of the monolithic flexure hinge structure is kept in a fixed position, and the upper or lower portion of the monolithic flexure hinge structure on which the lens is mounted is subjected to vertical translational motion, resulting in pure single-axis motion in a vertical direction.

In this case, various types of input units to convert rotational motion into precise vertical translational motion may be used.

As is apparent from the above description, according to example embodiments, a lens positioning unit may reduce and/or prevent parasitic motion in directions other than a desired positioning direction. Lens positioning may be performed with micron precision based on design of a flexure structure of the lens positioning unit. Also, owing to easy lens positioning, the lens positioning unit ensures convenient maintenance when applied to process equipment, such as LCD and semiconductor exposure apparatuses, resulting in reduced production costs.

While some example embodiments have been particularly shown and described, it will be understood by one of ordinary skill in the art that variations in form and detail may be made therein without departing from the spirit and scope of the claims.

What is claimed is:
1. A lens positioning unit of an optical system, comprising:
a hollow cylindrical housing;
a monolithic flexure hinge structure in the housing, the monolithic flexure hinge structure including an upper portion secured to the housing,
the monolithic flexure hinge structure including a lower portion, and the lower portion of the monolithic flexure hinge structure including a lens mount for mounting a lens;
a doughnut-shaped adjustor ring screwed to an inner surface of the housing; and
a ring-shaped spring secured to the lower portion of the monolithic flexure hinge structure,
the ring-shaped spring configured to transmit vertical translational motion of the adjustor ring to the monolithic flexure hinge structure.

2. The unit according to claim 1, wherein:
the monolithic flexure hinge structure includes a radial flange at an upper end thereof, and
the flange is secured to an upper end of the housing.

3. The unit according to claim 1, wherein:
the monolithic flexure hinge structure includes a recessed portion along an outer circumference of a lower end thereof, and
the ring-shaped spring is fitted into the recessed portion.

4. The unit according to claim 1, wherein
the lens mount includes a boss to come into point contact with the lens.

5. The unit according to claim 1, wherein:
an inner circumferential surface of the adjustor ring includes a groove, and
the ring-shaped spring is in the groove.

6. The unit according to claim 1, further comprising:
an adjustor configured to rotate the adjustor ring; and
a circumferential position of the housing defining an opening through which the adjustor is inserted to come into contact with the adjustor ring.

7. A lens positioning unit of an optical system, comprising:
a doughnut-shaped lower structure including a movable part that is rotatably coupled to a top of a fixed part; and
a monolithic flexure hinge structure in the lower structure,
the monolithic flexure hinge structure including a lower portion that is secured to the fixed part,
the monolithic flexure hinge structure including an upper portion having a lens mount for mounting a lens,
the upper portion of the monolithic flexure hinge structure being supported on a wedge on an upper surface of the movable part,
the wedge being configured to convert rotational motion of the movable part into vertical translational motion of the upper portion of the monolithic flexure hinge structure.

8. The unit according to claim 7, wherein:
an upper end of the monolithic flexure hinge structure includes a radial flange, and
the flange is on the wedge.

9. The unit according to claim 8, wherein
a lower surface of the flange includes a ball bearing receptacle in which a ball bearing is accommodated.

10. The unit according to claim 7, wherein
the wedge includes a gradient of 1:20.

11. The unit according to claim 7, further comprising:
a pusher to rotate the movable part.

12. The unit according to claim 7, further comprising:
a locker to secure the movable part to the fixed part.

13. The unit according to claim 7, further comprising:
a lens jig to be mounted on the lens mount.

14. A lens positioning unit of an optical system, comprising:
a fixed structure;
a monolithic flexure hinge structure including an upper portion and a lower portion,
one of the upper portion and the lower portion including a lens mount for mounting a lens, and
the other of the upper portion and the lower portion being secured to the fixed structure; and
an input unit rotatably coupled to the fixed structure,
the input unit configured to convert rotational motion into vertical translational motion so as to transmit the vertical translational motion to one of the upper portion and the lower portion of the monolithic flexure hinge structure including the lens mount.

15. The unit of claim 14, wherein:
the fixed structure is a housing with a surface that defines screw threads;
the upper portion of the monolithic flexure hinge structure is a flange secured to the housing;
the lower portion of the monolithic flexure hinge structure is a recessed portion of the monolithic flexure hinge structure that includes the lens mount;
the input unit is an adjustor ring rotatably coupled to the screw threads of the housing; and
the adjustor ring is configured to be rotated relative to the housing such that the rotational motion of the adjustor ring is converted to vertical translational motion of the adjustor ring based on the screw threads of the housing.

16. The unit of claim 14, wherein:
the fixed structure is a fixed part of a lower structure;
the input unit is a movable part of the lower structure that is rotatably coupled to the fixed structure;
the movable part is configured to be rotated; and
the movable part includes at least one wedge that is configured to convert rotational motion of the movable part into vertical translational motion of a ball bearing on the at least one wedge.

* * * * *